United States Patent
Hillard et al.

(10) Patent No.: US 7,564,859 B1
(45) Date of Patent: *Jul. 21, 2009

(54) METHOD AND SYSTEM FOR OPTIMIZED ROUTING AND PROTECTION OF VT TRAFFIC IN SONET NETWORKS

(75) Inventors: David A. Hillard, Novato, CA (US); Anix Anbiah, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 11/604,600

(22) Filed: Nov. 27, 2006

Related U.S. Application Data (63) Continuation of application No. 09/584,237, filed on May 31, 2000, now Pat. No. 7,161,944.

(51) Int. Cl.
*H04L 12/66* (2006.01)
(52) U.S. Cl. .................. 370/404; 370/463; 370/537; 370/907
(58) Field of Classification Search .............. 370/404, 370/907
See application file for complete search history.

(56) References Cited

U.S. PATENT DOCUMENTS

| | | | |
|---|---|---|---|
| 3,674,936 A | 7/1972 | Wolfe | |
| 4,998,242 A * | 3/1991 | Upp | 370/392 |
| 5,412,652 A | 5/1995 | Lu | |
| 5,838,924 A | 11/1998 | Anderson et al. | |
| 5,923,646 A | 7/1999 | Mandhyan | |
| 6,047,385 A | 4/2000 | Guzman et al. | |
| 6,236,660 B1 * | 5/2001 | Heuer | 370/409 |
| 6,249,510 B1 | 6/2001 | Thompson | |
| 6,282,193 B1 * | 8/2001 | Hluchyj et al. | 370/356 |
| 6,400,859 B1 | 6/2002 | de Boer et al. | |
| 6,563,795 B1 | 5/2003 | Gruber et al. | |
| 6,587,470 B1 | 7/2003 | Elliot et al. | |
| 6,614,785 B1 | 9/2003 | Huai et al. | |
| 6,671,271 B1 | 12/2003 | Takemura et al. | |
| 6,697,856 B1 | 2/2004 | Hillard et al. | |
| 6,765,880 B1 | 7/2004 | Hillard et al. | |
| 7,161,944 B1 * | 1/2007 | Hillard et al. | 370/397 |

* cited by examiner

*Primary Examiner*—Chi H. Pham
*Assistant Examiner*—Shick Hom
(74) *Attorney, Agent, or Firm*—Cindy Kaplan (57) ABSTRACT

The invention provides a method and system for enhancing the capability to optimally route VT circuits over SONET networks. The invention discloses a method for identifying Network Elements (NEs) that have VT capability (i.e., VT cross connect capability) and, when desired or required for VT circuit routing, manually or automatically topologically interconnecting these NEs by STS-1 circuits called VT Tunnels. Once interconnected, these VT Tunnels are suitable for supporting user VT traffic without the network operator being required to upgrade non-VT NE with VT capability or without having to exhaust the limited pool of available VT cross connects on one or more NEs.

12 Claims, 9 Drawing Sheets

METHOD AND SYSTEM FOR OPTIMIZED ROUTING AND PROTECTION OF VT TRAFFIC IN SONET NETWORKS

RELATED APPLICATION

This patent application is a continuation of U.S. patent application Ser. No. 09/584,237, filed May 31, 2000, which is incorporated herein by reference in its entirety.

CROSS-REFERENCES

The following are related and co-pending U.S. patent applications: application Ser. No. 09/274,078, entitled "Flexible Cross-connect with Data Plane," filed on Mar. 22, 1999 (U.S. Pat. No. 6,587,470, issued Jul. 1, 2003), application Ser. No. 09/478,287, entitled "Automatic Propagation of Information in a Communications Network," filed on Jan. 5, 2000; application Ser. No. 09/487,366, entitled "Method and Shortest Path Tree Algorithm to Support Routing of Paths for Virtual Path Protected Circuits in SONET Networks," filed on Jan. 18, 2000 (U.S. Pat. No. 6,765,880, issued Jul. 20, 2004); application Ser. No. 09/444,052, entitled "Healing of Incomplete Circuits in Networks," filed on Nov. 19, 1999 (U.S. Pat. No. 6,697,856, issued Feb. 24, 2004); application entitled "Network Management Systems that Receive Cross Connect and/or Other Circuit Information from Network Element," of which Suhas Mansingh and Wayne Cannon are the inventors, and which was filed on May 31, 2000 and issued on Jun. 15, 2004, as U.S. Pat. No. 6,751,660. All of the aforementioned applications are incorporated herein by referenced in their entirety, but are not admitted to be prior art. The following published standards are hereby incorporated by reference in their entirety: GR-253-CORE, and ANSI T1.105.

BACKGROUND OF THE INVENTION

Telecommunications systems are carrying increasing amounts of information, both in the long distance network as well as in metropolitan and local area networks. At present data traffic is growing much faster than voice traffic, and will include high bandwidth video signals. In addition to the requirement for equipment to carry increasing amounts of telecommunications traffic there is a need to bring this information from the long distance network to businesses and to locations where it can be distributed to residences over access networks.

The equipment which has been developed to carry large amounts of telecommunications traffic includes fiber optic transport equipment which can carry high-speed telecommunications traffic. The data rates on fiber optic systems can range from millions of bits per second (Mb/s) to billions of bits per second (Gb/s). In addition, multiple wavelengths of light can be carried on an optical fiber using Wavelength Division Multiplexing (WDM) techniques.

The ability to carry large amounts of telecommunications traffic on an optical fiber solves the long-distance point-to-point transport problem, but does not address the issue of how to add and remove traffic from the high-speed data stream. Equipment for adding and removing traffic has been developed and is referred to as "add-drop" multiplexing equipment.

Traditional designs for add-drop multiplexers are based on the use of multiple interface cards which receive high speed data streams, create a time division multiplex signal containing the multiple data streams, and route the time division multiplex signal to a cross-connect unit which can disassemble the data streams, remove or insert particular data streams, and send the signal to another interface card for transmission back into the networks. By aggregating the multiple data streams into a time division multiplexed data signal, the data rate of the time division multiplexed signal is by definition several times the rate of the maximum data rate supported by the interface cards.

Figure 1:
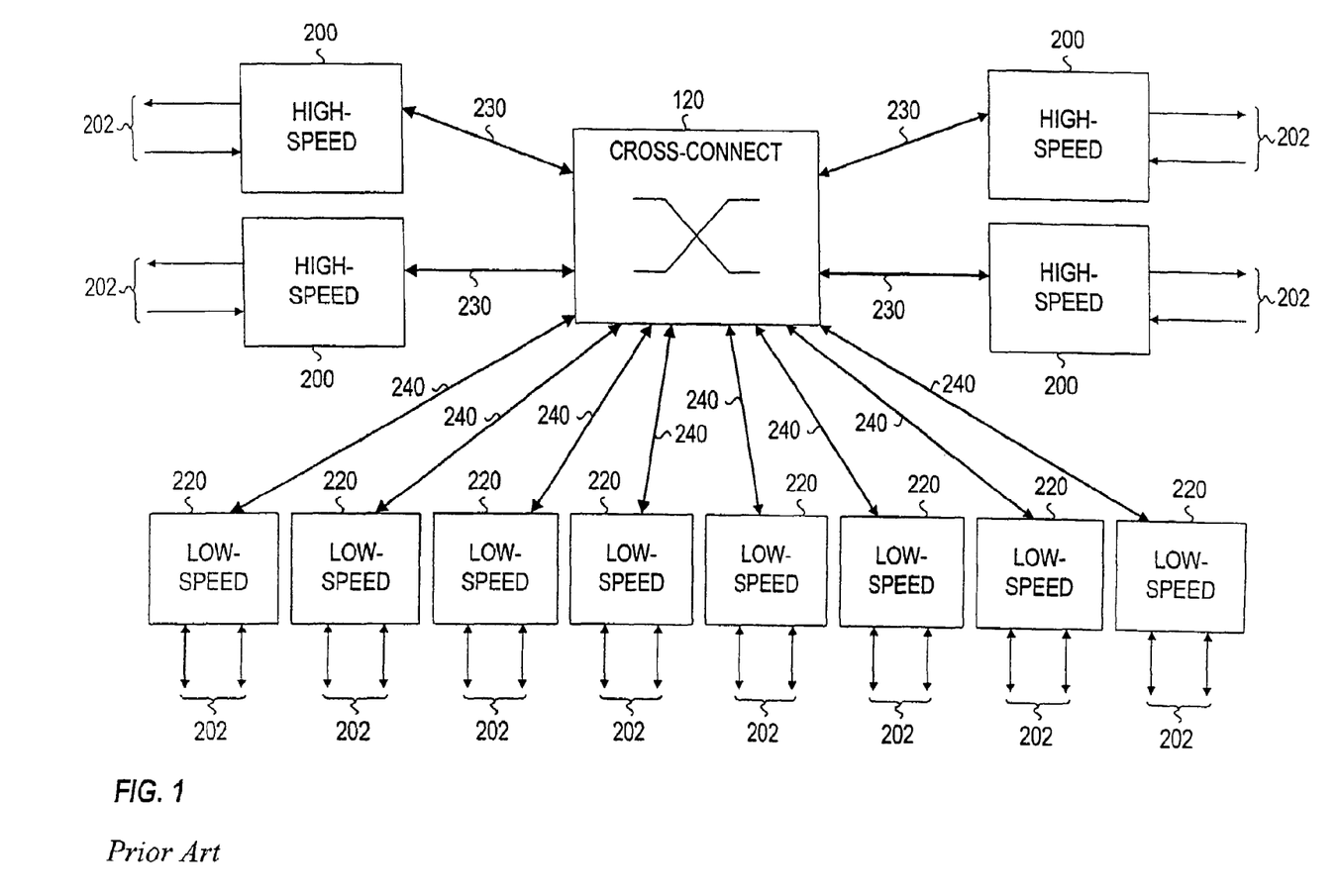
FIG. 1 illustrates a functional diagram of a flexible cross connect system utilized in one embodiment of the present invention.
Figure 2:
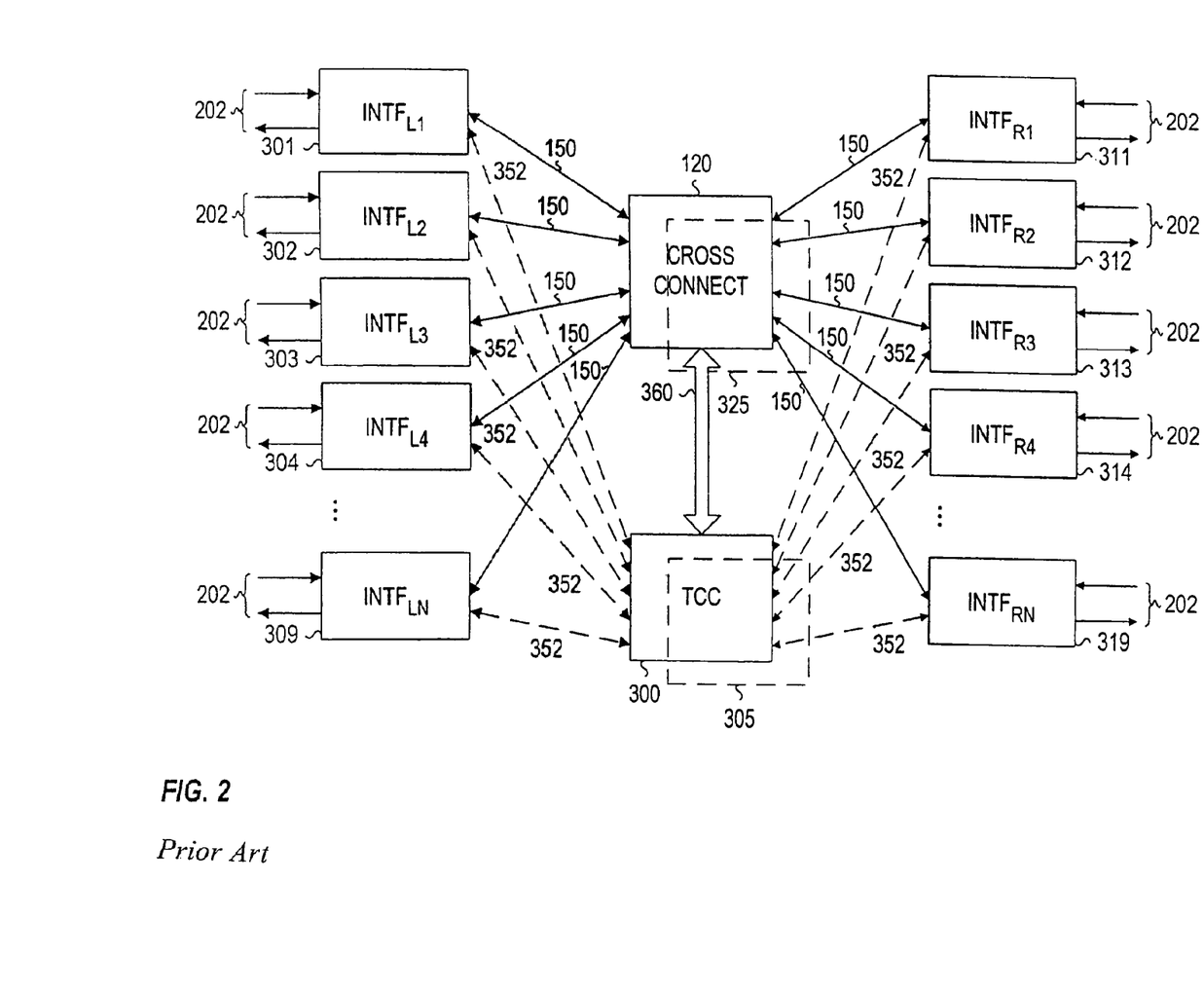
FIG. 2 illustrates communications channels between elements of the flexible cross connect system.
Figure 3:
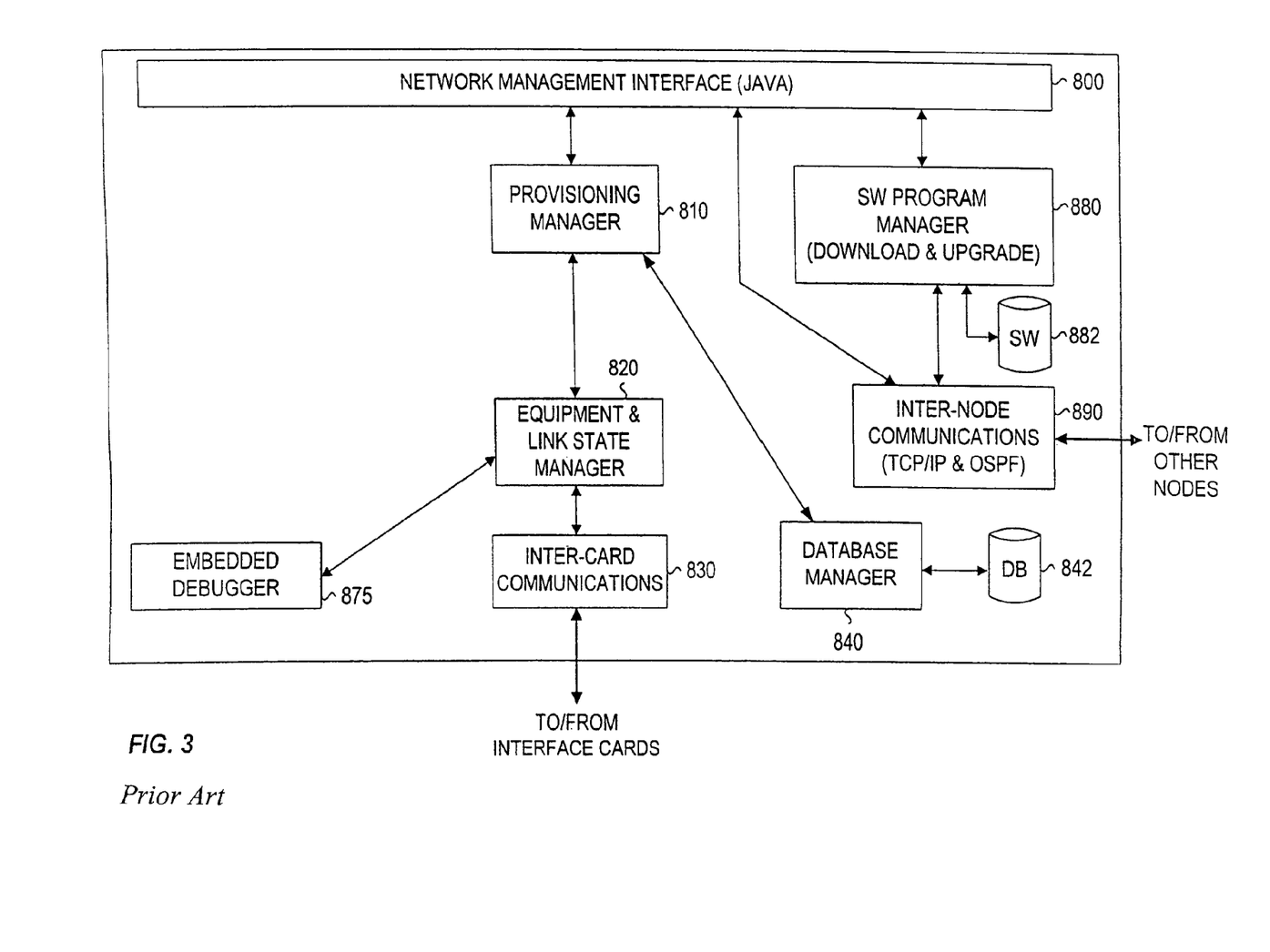
FIG. 3 illustrates the software architecture of the control system for the flexible cross connect system.

An advanced system for providing, among other things, the above mentioned functionality including routing and cross connecting circuits is described in detail in the co-pending application Ser. No. 09/274,078 which is incorporated herein by reference. In that system, cross-connects can groom traffic in STS-1 or VT1.5 payload increments to any port on any card. The cross connects are a means for directing and re-directing traffic in the network. This maximizes bandwidth efficiency by making it possible to groom SONET traffic in STS-1 or VT1.5 increments. FIGS. 1, 2, and 3 show various aspects of the flexible cross connect system as described in application Ser. No. 09/274,078. FIG. 1 illustrates a functional diagram of the flexible cross connect system; FIG. 2 illustrates communications channels between elements of the flexible cross connect system; FIG. 3 illustrates the software architecture of the control system for the flexible cross connect system. In a preferred embodiment XC unit 120 supports all VT 1.5 through STS-192 applications. Grooming and cross-connect functionality is well known to those skilled in that art.

A SONET network typically comprises multiple network elements, or nodes, interconnected by physical media (e.g., optical fiber links). When used herein, the term SONET is meant to include not only SONET, but also Synchronous Digital Hierarchy (SDH) networks and systems and other equivalents. Furthermore, when used herein, the term STS is meant to include not only SONET Synchronous Transport Signals (STS), but SDH Synchronous Transport Modules (STMs) and other equivalents, and the term Virtual Tributary (VT) is meant to include not only SONET VT, but SDH Virtual Container (VC) and other equivalents. In order to route communication signals in the network from one node, a source node, to another node, a destination node, it is necessary to establish a circuit between the source and destination nodes. Establishing such a circuit entails provisioning a path, through the network, from the source node to the destination node. This path will typically traverse one or more other intervening nodes. A network manager (i.e., a user) typically is able to view, via a Network Management System's (NMS) graphical user interface (GUI), the network, and is able manually route a circuit through the intervening nodes. Alternatively, a routing algorithm can be used to automatically find one or more of such paths between two nodes. Routing algorithms such as Djikstra's SPT algorithm are well known to those skilled in the art. Advanced algorithms such as those described in the copending application Ser. No. 09/487,366, are utilized in the present invention to identify parameterized least cost paths.

Generally, in order to route (and switch) a VT circuit through the network while traversing a particular NE, the NE must provide VT cross-connect functionality. Individual network elements (NEs) may provide different levels of service regarding cross-connect functionality. It is not uncommon in art, for example, for some NE not to support VT cross connections at all. Alternatively, other NE may provide only a limited number of VT cross connects (XC). VT cross-connects are thus a precious resource in a network and within elements that provide such functionality, and the number of VT circuits that can be routed through a typical NE is typically relatively low (e.g., 1/10). In order to route (i.e. cross-connect) a VT circuit through various NEs in the network therefore, each network element would have to support VT cross-connects, that is, each NE would have to provide VT cross connect functionality. As previously stated, prior and current art NE either do not provide such VT cross connect functionality or they provide limited functionality (i.e. the number of VT cross connects in a NE, and thus the number of VT circuits which can be routed through the NE, are limited). This lack of available VT cross connects poses restrictions on routing VT circuits. In one case, a network path cannot be found for a VT circuit between two nodes because one or more intervening nodes in each possible path does not support or provide VT cross connects. In this case, it would not be possible to route a VT circuit between the two nodes.

In another case, there may exist one or more paths between the two nodes in which each intervening node supports VT cross connects, but this path may not be the shortest or least cost path. As stated above, routing circuits via a least cost path is desirable for network bandwidth optimization. Thus, although a VT circuit can be routed between the two nodes, it will not be the optimal, least cost, path. In another example, perhaps a least cost path can be found on which to route the VT circuits (i.e. the intervening nodes support the VT XCs), but an alternative path supporting VT XC required for path protection, cannot be found. This scenario would prohibit the provisioning of a least cost path protected VT circuit.

In summary, because provisioning VT circuits typically entails provisioning VT cross connects (XC) on intermediate nodes, routing VT circuits on such a network may be difficult or impossible due to a limited capacity or lack of available VT XC. Furthermore, although a path may be found on which to route the VT circuit, this path may not be the shortest path or may not be protectable, and would thus be sub-optimal.

Based on the foregoing description, there is a need for a method and system for enhancing the network topology on which VT circuits can be routed and for optimally routing and provisioning VT circuits through NE that provide limited or no support for cross connecting VT circuits.

SUMMARY OF THE INVENTION

The present invention provides a method for enhancing the capability to optimally route VT circuits over SONET networks. The invention discloses a method for identifying Network Elements (NEs) that have VT capability (i.e., VT cross connect capability) and, when desired or required for VT circuit routing, manually or automatically topologically interconnecting these NEs by STS circuits called VT Tunnels. Once interconnected, these VT Tunnels are suitable for supporting user VT traffic without the network operator being required to upgrade non-VT NE with VT capability or without having to exhaust the limited pool of available VT cross connects on one or more NEs.

A VT Tunnel (VTT) is an STS path, with an associated circuit ID, used to carry VT traffic that has STS termination at both ends, typically on a VT cross-connect card. Such a VTT is a transport circuit used to carry VT circuits through a node without the need for VT cross-connections. A VTT comprises one or more STS cross-connections that allow VT circuits to be routed through one or more NE via a single STS circuit. In a preferred embodiment, up to 28 VT1.5 circuits can be routed through one or more NE via a single STS-1 circuit. The present invention provides for the routing, creation, and deletion of VT Tunnels, allowing VT level circuits to effectively traverse STS cross-connects. A VT Tunnel (VTT) allows VT traffic to pass through one or more NEs that either do not or cannot support VT cross connections. Thus, VT cross-connections can be conserved at VT capable NEs and VT traffic can be routed through a node that does not have VT switching capability.

Typically, in order to route circuits, a routing algorithm, such as Djikstra's shortest path tree (SPT) algorithm, is used to find the best or 'shortest' route. For routing VT circuits, a topology of VT capable NEs and their associated links, the VT topology, is used to construct such a VT route. VT Tunnels which begin and end on NEs that support VT cross connects, but which traverse non-VT capable NEs, are logical circuit entities that can be constructed and added to the network VT topology and over which VT circuits can be routed. These created VT tunnels provide paths for VT circuits through NEs that either do not support VT cross-connections, or for which the pool of available VT cross connects is limited or exhausted.

It is an object and advantage of the present invention to provide a mechanism for routing Virtual Tributary (VT) circuits through network elements (NEs) that do not support VT cross connects (XCs), thus increasing the effective bandwidth for VT circuits through such NEs and for particular network paths.

It is a further object and advantage of the invention to provide a mechanism by which VT circuits can be routed through NEs supporting VT cross connects, but for which the available pool of VT cross connects is either exhausted or for which there is a desire to conserve such VT XCs, thus increasing the effective bandwidth for VT circuits through such NEs and for particular network paths. When either a NE does not support VT cross-connects or has none remaining available, or when the user wishes to conserve those that are left, for future VT termination points at the NE, a VT tunnel can be created that traverses one or more of such NEs such that VT circuits can be routed through those NEs without the need for utilizing VT cross connects on those NEs.

It is another object and advantage of the invention to provide a method to route VT circuits over least cost paths, even when such 'shortest paths' traverse NEs that either do not support VT cross connects or for which there is a desire to conserve the available VT cross connects. A single VT Tunnel can transit one or more NEs. These tunnels allow for a new VT topology to be described that facilitates VT traffic routing (e.g. by shortest path first routing) throughout a SONET network of mixed VT and STS cross-connection supporting NEs.

It is a another object and advantage of the invention to provide for path protected VT circuits, even when the alternate redundant paths traverse NEs that either do not support VT cross connects or for which there is a desire to conserve the available VT cross connects. VT Tunnels allow for alternative and simpler VT traffic protection by making use of the STS traffic protection schemes employed in the network.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENT

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose. More specifically, although in the preferred embodiments, a specific system is described, the invention may be implemented on a variety of hardware and software platforms, and is not limited to any particular processor or hardware configuration, operating system, or development language, as will be evident to those skilled in the art.

The invention comprises a method and apparatus for routing VT circuits through intermediate NE for which utilizing VT cross connections is either not supported or not desired. Such circumstances may occur if NEs within the network are capable of switching or cross-connecting only STS circuits, or when a NE that supports VT switching has exhausted its capacity to do so, or when the user (e.g., Network Manager) wishes to conserve the existing but limited number of VT cross connections on one or more NE, for future VT termination points at those NE.

A VT tunnel (VTT) is a logical link (comprising multiple physical links), established between two NEs that support VT cross-connects, over which VT circuits can be routed. An STS pipe is provisioned between these two NE, the STS circuit traversing one or more intervening NE. These intermediate NE need only provide STS cross connections for the STS pipe. In a preferred embodiment, the VT Tunnel is this STS-1 pipe designated as carrying VT traffic (as opposed to DS3, etc.), and is an efficient means of transporting the VT's from one NE to another. In this embodiment, up to 28 VT1.5 circuits can be routed within the VTT. These VT circuits can thus be routed through NE that do not support VT cross connections (XC). In general, VTTs allows VT circuits to be routed over STS pipes between originating and terminating VT capable NE while traversing NE that need not provide VT switching capability. Different size VTT can be constructed using different size STS pipes (e.g., STS-3, STS-12, etc.), and different size VT circuits (e.g., VT2, VT6, etc.) can be routed over these VTT. These VTT which become part of the VT topology, dramatically increase the networks capability and capacity for routing VT circuits.

As discussed above, one common method for routing circuits is to identify the "shortest" or "least cost" path between the source and destination nodes. This type of circuit routing provides a means for optimizing bandwidth allocation and utilization. When attempting to route circuits the Network Management System's (NMS) routing algorithm searches for the shortest path (or shortest protectable path) on a particular network topology depending on the type of circuit (VT or STS) being routed and on whether or not path protection is required. This routing algorithm is described in copending application, Ser. No. 09/487,366, which is incorporated herein by reference.

The topology of the network can be thought of as the NEs in the network and the physical links between these NEs. This set of all links, (including link attributes) and nodes, is the physical (STS) or complete topology. This is termed the STS topology since all the nodes and links support STS traffic. One attribute of a link is whether or not it is a protected link. Some links will be line protected (e.g. BLSR, 1+1, etc.), whereas other will not. A second topology is defined, the unprotected physical topology, a subset of the complete physical topology, consisting of all the unprotected links in the physical topology. This unprotected topology is used, among other things, to find edge disjoint paths for virtual UPSR circuits.

It is also useful to define a topology for routing VT circuits. Some NE in the network, although providing STS switching capability, will not support (or have available) VT XCs. VT circuits cannot readily be routed over links that span such NEs. The VT topology is a subset of the physical topology, comprising the links between NEs that do support VT XCs. The VT topology also contains VT Tunnels (VTT) which are essentially logical VT links between two VT capable NE and which are described further below. Analogous to the unprotected physical topology, an unprotected VT topology is also defined which comprises all the unprotected links within the VT topology, including the unprotected VT Tunnels (described further herein). These four topologies are generated maintained by the NMS based on autodiscovery and propagation of network topology information described in copending application Ser. No. 09/478,287, incorporated herein by reference. The routing algorithm searches for "shortest paths" on particular network topologies depending on the type of circuit that needs to be created.

The user can manually provision a circuit by specifying each link and node (i.e., the hops) that the circuit traverses or alternatively, utilize the routing software to find the best path. The routing algorithm, given a source and destination node, along with other information including circuit size, type, and protection requirement, will attempt to find the shortest path route for the particular circuit. Based on the circuit type, STS or VT, a particular topology is used on which to find the shortest path for the circuit. STS circuits are routed on the STS topology and VT circuits are routed on the VT topology.

As stated, when a circuit needs provisioning, a source NE (src) and destination NE (dst), among other things, are specified and the routing algorithm attempts to find the shortest path for the desired circuit on the appropriate topology. Paths will typically traverse intervening NE, these NE being required to provide the necessary cross connections for the circuit. For VT circuits, the NEs must be capable of cross-connecting circuits of VT granularity (e.g. VT1.5), and thus the routing algorithm will utilize the VT topology to attempt to route VT circuits. Available VT cross connections on the multitude of NEs within a network is typically limited or absent, and thus the VT topology is correspondingly limited.

Application Specific Integrated Circuits (ASICs) are used, among other hardware and software to implement and provide cross connect capability at VT1.5 granularity. These ASICs reside on the cross-connect cards of a NE and provide the capability of cross-connecting VT circuits as well as STS circuits. Although these ASICs provide for cross-connect switching at a VT1.5 granularity, the number of VT circuits that can be cross-connected by a given ASIC (and thus XC card) is limited (e.g., only 1 in 10 circuits traversing an XC card can be a VT circuit in the current implementation described herein). This limitation of VT cross-connections in a VT capable NE, common in the prior and current art, is due to the limitation on the number of VT termination points on the NE XC card's ASICs. VtAdits are connection objects used in the present invention and are essentially terminations of STS circuits, designated as carrying VT circuits, on VT cross connects. These VtAdits represent a type of connection object, and provide the mechanism for inserting and extracting VT circuits from STS pipes. The STS pipes (i.e., circuits), which terminate on VtAdits and which are used for routing VT circuits, are called VT Tunnels.

Figure 4:
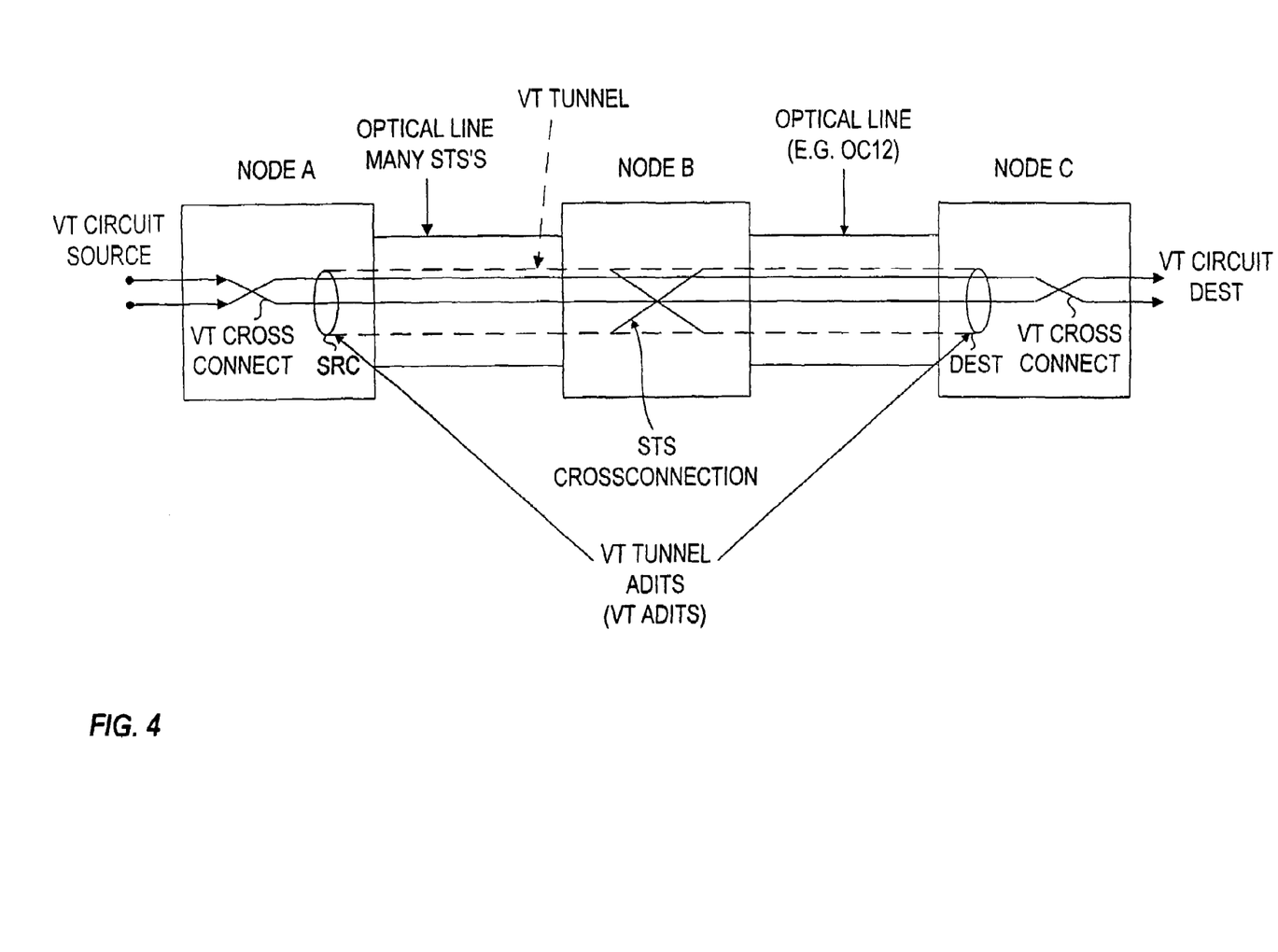
FIG. 4 illustrates the structure of an exemplary VT Tunnel according to one embodiment of the present invention.

In order to effectively increase the VT topology and thus increase bandwidth and available paths for VT circuits, one or more entities, called VT Tunnels (VTT) can be created. These VTTs, which, in one embodiment, are essentially STS-1 pipes in which VTs can be inserted and extracted, can be used to route VT circuits between a src node and a dst node, both of which are VT capable, but without having to utilize VT XC on intermediate nodes. The intermediate nodes provide STS XC for the STS-1 pipe. VT circuits can be inserted and/or extracted at the src and dst nodes, but not at the intermediate nodes. In a preferred embodiment, up to 28 VT1.5 circuits can be contained within one VT Tunnel (STS-1). A VT tunnel, while comprising a sequence of physical links between a src and dst node, is represented, topologically, as a single logical link between the two NEs (src and dst) that support and perform VT cross connections. VTTs are used for routing VT circuits and are components of the VT topology. A VT Tunnel is always bi-directional, meaning that a circuit can be routed in either direction. For example, a VT circuit can be routed over the VT Tunnel from nodes A to Z, A being the src node and Z being the dst node, and a VT circuit can be routed using the same VTT with node Z as the src and node A as the dst. When a VT circuit is routed over (i.e., within) a VT tunnel, the VT Tunnel is considered to be one (1) span of the VT circuit (and is represented as a single link in the VT topology), even though the VT Tunnel may traverse multiple intermediate nodes. The number of VT Tunnel spans, however, is related to how many actual links and nodes the Tunnel traverses. A VTT can also be classified as protected or unprotected. The VTT is protected if each link of the VTT in protected (e.g., 1+1 or BLSR). FIG. 4 illustrates the structure of an exemplary VT Tunnel according to one embodiment of the present invention. As shown, the VTT comprises an STS-1 pipe provisioned between two NE, A and C, that provide VT XC capability. The STS pipe traverses intermediate node B, being STS cross connected at nodes B and C. The endpoints of the VTT are the VtAdits at the src and dst NE A and B. The VtAdit is a connection object, created on a VT capable NE, that allows VT circuits to be added and extracted from an STS pipe. Once a VtAdit is created on a node, the node can now be used to cross connect VT circuits into and out of the STS pipe (i.e., the VT Tunnel). In this example, a VT circuit is added to the VTT at src A, travels through NE B and C, and is extracted from the STS connection via the VtAdit at dst D. The VT circuit is thus routed via NE that are not required to provide VT XC capability. As will be evident to those skilled in the art, multiple VTT STS pipes could have been created that traversed multiple intermediate node, being STS cross connected at these nodes.

Figure 5:
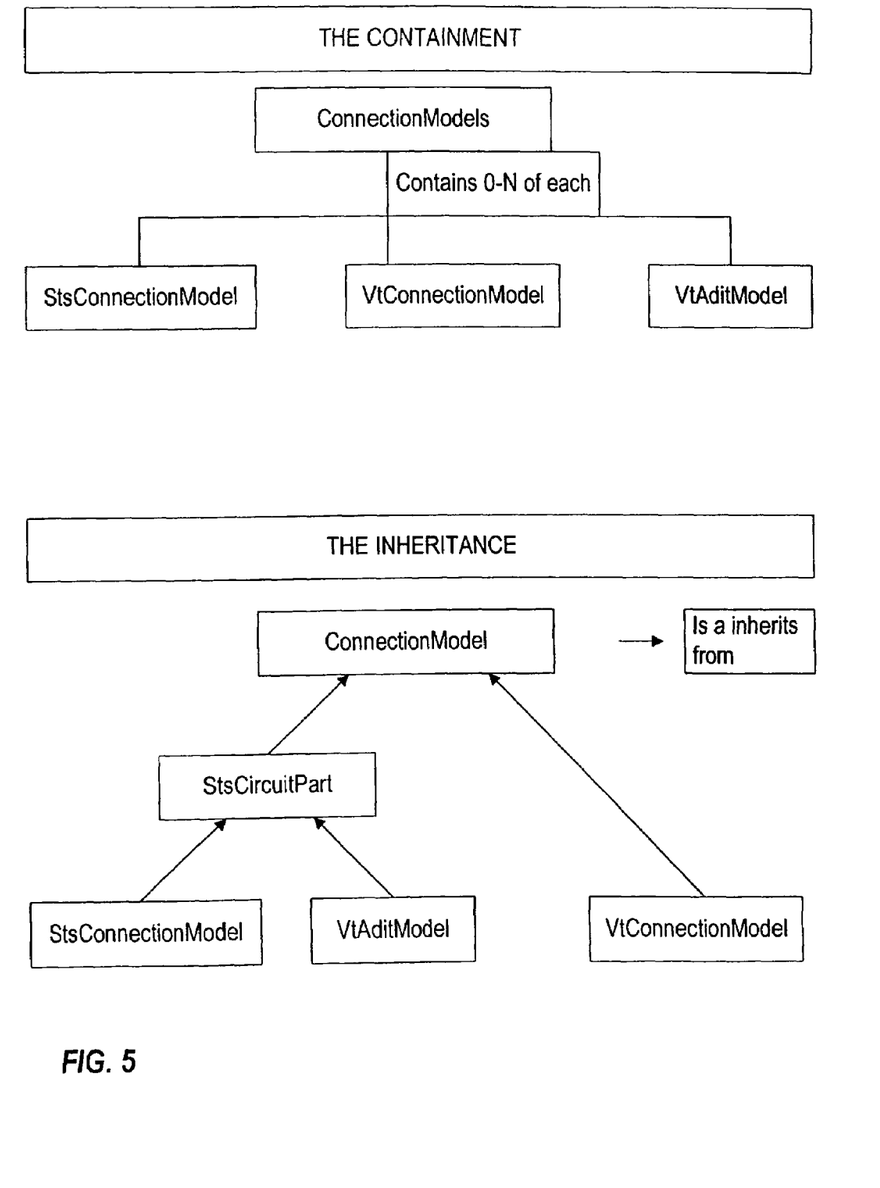
FIG. 5 is a class hierarchy diagram illustrating the relationships between the three types of connection objects, STS, VT, and VtAdit utilized in the present invention.

In order to create a VT Tunnel, the src and dst NEs are specified. One VtAdit on each of the src and dst node are used to create the endpoints of the VT Tunnel. After the VtAdits are provisioned, the STS cross connections on the intermediate nodes are created to complete the VT Tunnel. VtAdits, used to originate and terminate a VT Tunnel, are forms of connection objects analogous to STS and VT connection objects. An STS or VT cross connection typically comprises ingress and egress interfaces (e.g., ports of a XC card). The cross connection essentially routes circuits entering the ingress interface to exit the egress interface. In the case of a STS cross connect, the incoming and outgoing circuit is an STS circuit, and in the case of a VT circuit, the incoming and outgoing circuit is a VT circuit. A VtAdit connections provides for both inserting a VT circuit into an STS pipe and extracting a VT circuit from an STS pipe. Essentially, one of the interfaces of a VtAdit receives or outputs VT circuits whereas the other interface receives or extracts STS circuits. FIG. 5 is a class hierarchy diagram illustrating the relationships between the three types of connection objects, STS, VT, and VtAdit utilized in the present invention.

Figure 6:
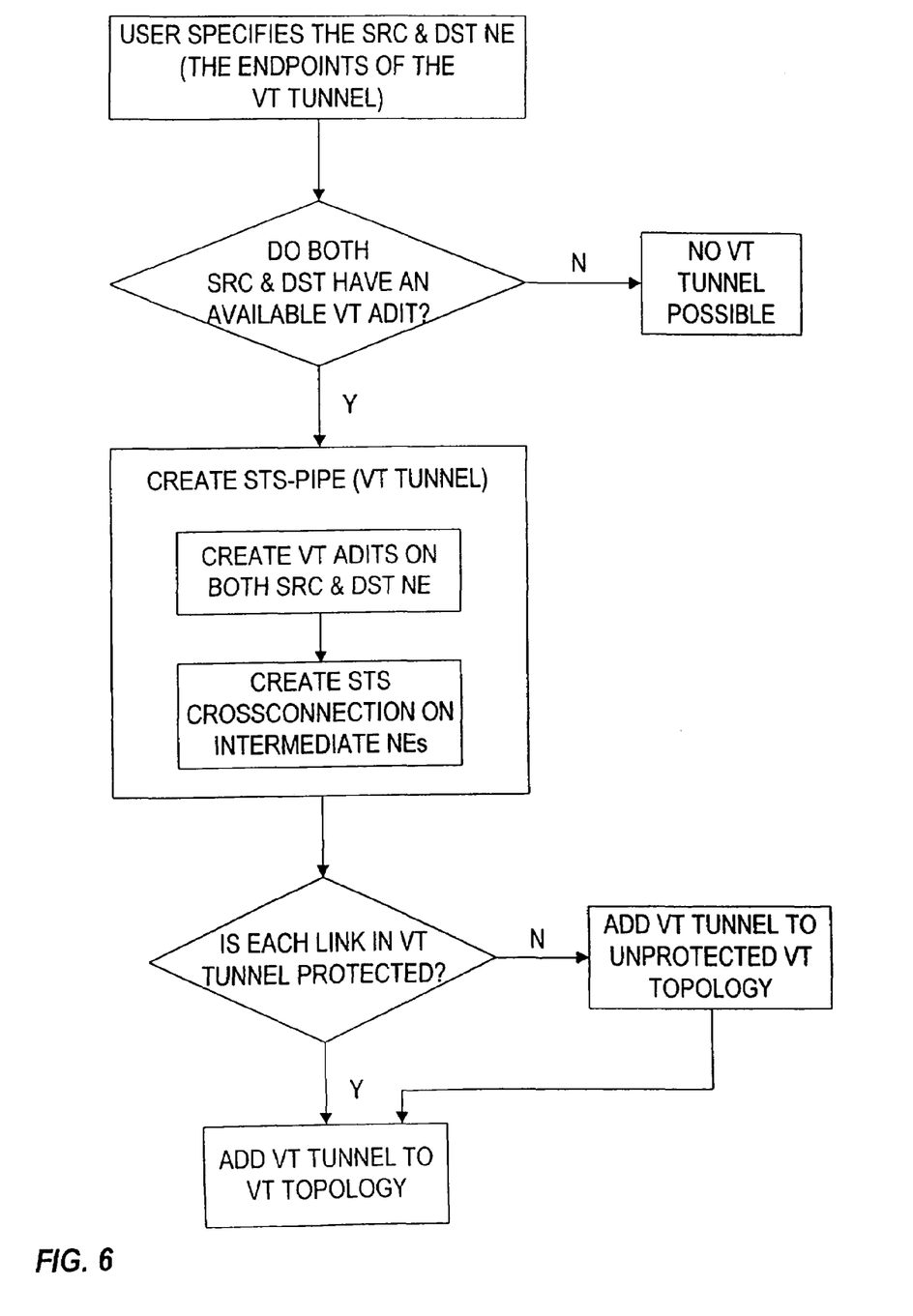
FIG. 6 illustrates a process flow by which a VTT is created according to one embodiment of the present invention.

FIG. 6 illustrates a process flow by which a VTT is created according to one embodiment of the present invention. For example, a src node is chosen as the source of a VT Tunnel (VTT) and a dst node is chosen as the destination of the VTT. A VtAdit connection is created on both nodes, and necessary STS cross connections are created on the intermediate nodes thus creating the STS pipe (VTT). This VTT is added to the VT topology as a single link. On the src node, where VT circuits are added to the VTT, the VT circuit enters the ingress interface of the VtAdit, and is added to the STS pipe at the egress interface of the src VtAdit. On the dst node, the STS pipe terminates at the ingress interface of the VtAdit connection, the VT circuit is extracted from the egress interface of the dst VtAdit. Users, or the routing software, can add VT Tunnel endpoints at NE's as the pool of VTAdits permits, these VtAdits appearing as VTT circuit source and destination points in the NMS GUI. Once the VTT endpoints are specified, an STS-1 path is routed and created over the physical topology from the src to dst nodes. After a VT Tunnel is created, the VTT link is added to the unprotected VT topology unless each link of the VTT is line protected (e.g., 1+1, BLSR), in which case it is added to the complete VT topology.

VT Tunnels can be created and circuits routed manually by the user or automatically by the routing software. The NMS can determine, based on the VT circuit request, whether a VTT is required, optional, possible, or even relevant. For instance, unless the request is for a VT circuit, VT Tunnels would not be relevant, and unless the src and dst nodes have available VtAdits, a VTT will not be possible. Alternatively, if there is an existing route for the VT circuit, then a VTT will not be required; a VT circuit would still be optional however. Another possibility is when no route for the VT circuit can be found on the existing topology in which case a VT Tunnel will be required to route the circuit. A VT Tunnel will be required when the path traverses NEs that cannot provide VT cross connect functionality. If all nodes in the path support VT XC, then a VT Tunnel is not required, and is designated as optional. Although not required, it may be desirable to create a VT Tunnel such that the existing VT XC on the intermediate node are conserved. The user may choose to create or not create a VT tunnel when such VTT is optional. The NMS manages such determinations, informs the user, and either automatically or based on input from the user routes and provisions the VTT. A created VT Tunnel is added to the VT topology such that it can be used subsequently by the routing software to route and provision additional VT circuits.

Because the size or capacity of a VT Tunnel is, in one embodiment, equivalent to an STS-1 circuit, the number of VT1.5 circuit that can be routed within a single VTT is limited to 28. When 28 VT1.5 circuits have been routed in the VTT, the VTT is considered full and no other VT circuits can be routed using the VTT, and another link or path segment must be considered for the VT circuit. A VTT can also be empty. A VTT is empty when it does not contain any VT circuits. If an empty VT Tunnel was created manually by user, then a user must also manually delete it in order to deprovision the VTT. However, if the VT Tunnel was created automatically by routing software, then the VT tunnel will be automatically deleted by the software when the VTT becomes empty. Whether the VTT circuit was created automatically or manually is a stored and persistent attribute of the VTT circuit. This VTT deletion deprovisions the STS XC on the intermediate node and frees the VtAdits on the src and dst nodes.

The following describes how, in specific exemplary cases, VT Tunnels are created and utilized to optimally route VT circuits. These examples serve to illustrate the utility of and mechanism by which VT circuits are routed over VT Tunnels. Other scenarios for using VTT to route VT circuits are also possible as will be evident to those skilled in the art.

The user (e.g., Network Manager) may wish to manually provision a VT Tunnel. This may happen, for instance, when the user identifies or has a preference as to how one or more VTs circuits should be routed and provisioned. Because the user's desired or proposed route may not support VT XCs (i.e. one or more NE do not support VTs), or the user wishes to conserve VT XC, the user may provision a VT Tunnel. The user manually specifies a src and a dst node, both src and dst nodes supporting VT XC, and the intermediate nodes. The provisioning software would then construct the VT Tunnel by creating a VtAdit on both the src and dst nodes and by creating the required STS cross connections on the intermediate nodes. This newly created VT Tunnel is then added to both the VT Topology and to the VT unprotected Topology, unless it is an unprotected VTT, in which case it is added to the unprotected VT Topology only, and will be available for the routing of other VT circuits until it is full (e.g., contains 28 VT1.5 circuits in the case of an STS-1 pipe).

Figure 7A:
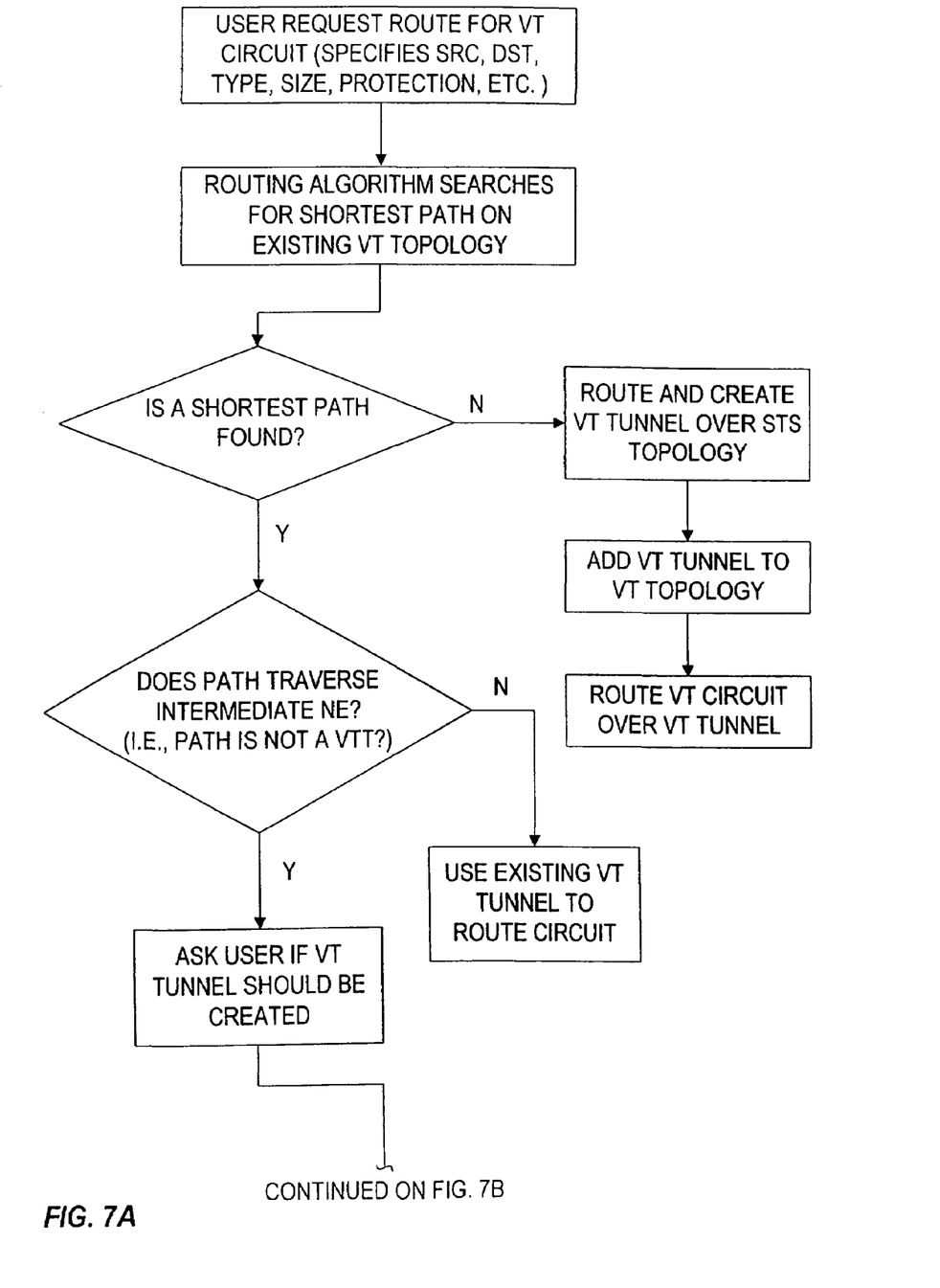
FIGS. 7a and 7b illustrate an example sequence of steps taken in order to provision a VT circuit using a VTT according to one embodiment of the present invention.
Figure 7B:
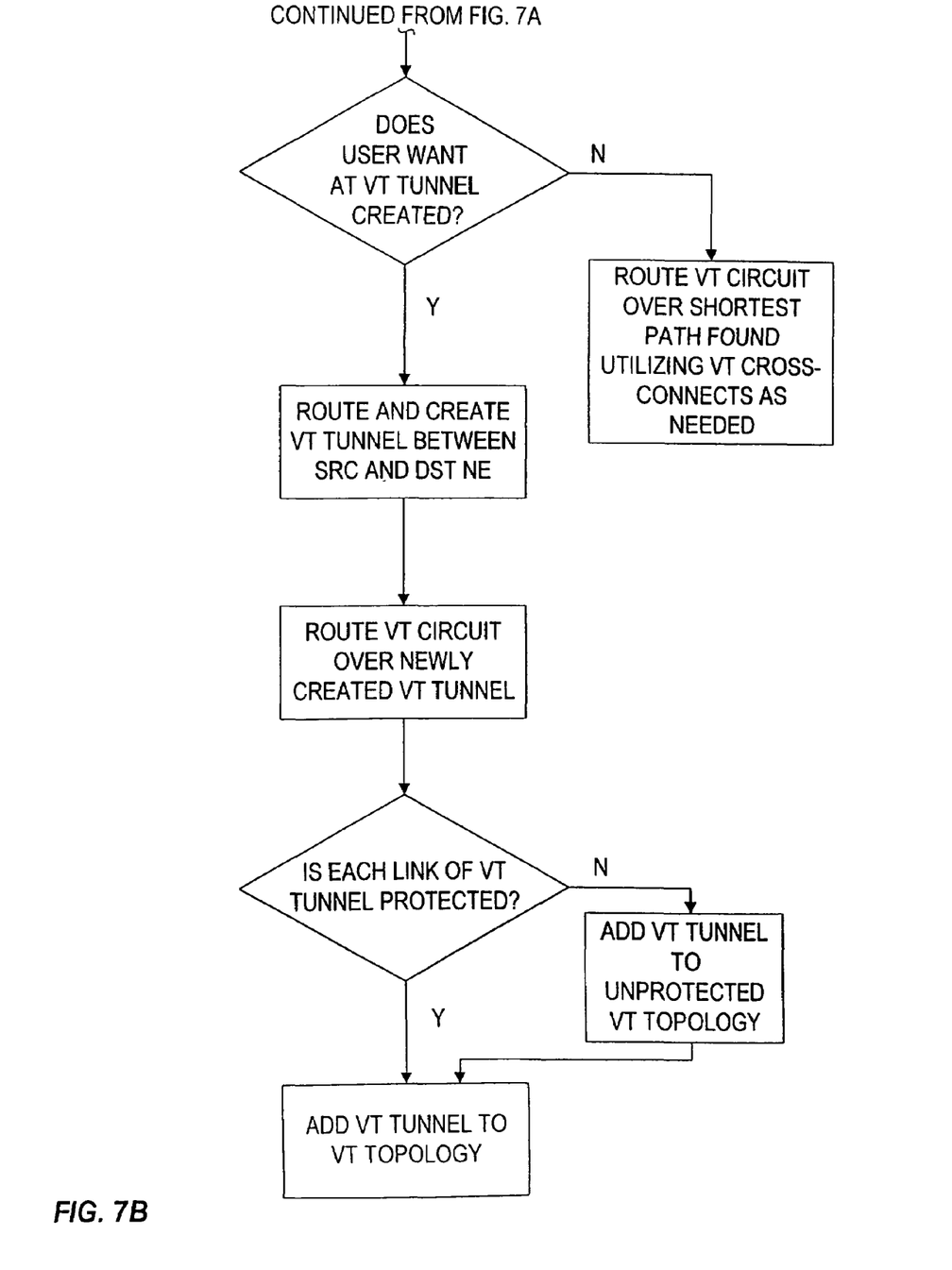

For example, if a user wishes to create one or more VT circuits from node A to node C, via intermediate node B, while conserving VT cross-connects at node B, the user would manually create a VT Tunnel circuit from node A to node C, via node B. The VTAdit creations at nodes A and C are done automatically as is the STS connection on node B. The VTT is added to the VT topology. VT Tunnels can also be created automatically by the NMS (i.e., the routing software). FIGS. 7a and 7b illustrate an example sequence of steps taken in order to provision a VT circuit using a VTT according to one embodiment of the present invention.

A user specifies a src and a dst node for a VT circuit. If both src and dst have an available VtAdit (i.e., VT XC capability), the routing algorithm attempts to route the VT circuit over the existing VT topology using existing VTTs as much as possible. If the route identified (e.g., shortest path route) involves traversing intermediate nodes, then the route is not a VT Tunnel and no appropriate (or available) VTT exists for the proposed route. A path found over the VT topology would necessarily traverse NE that provide VT cross connecting capability. In this case, the user is queried by the NMS software as to whether or not the user would like the NMS to automatically create a VT Tunnel. If the user requests that a VTT be created, then the NMS routes and creates a VTT between the two nodes, and then routes the VT circuit over the new VTT. The VTT is routed and created over the physical (STS) topology since the VTT is an STS pipe requiring only STS cross connections at the intermediate nodes, and the newly created VTT is added to the VT topology. If the user chooses not to create the VT Tunnel, then the VT circuit is provisioned using the original route, found by the NMS, using the VT cross connections on the intermediate nodes as needed.

If no route can be found over existing VT topology, then the routing algorithm will attempt to route and create a VT tunnel over the physical (complete) topology from the src NE to dst NE, and then use this VTT to route the new VT circuit. In each case where a new VT Tunnel is created, the VTT link is added to the VT topology.

Figure 8:
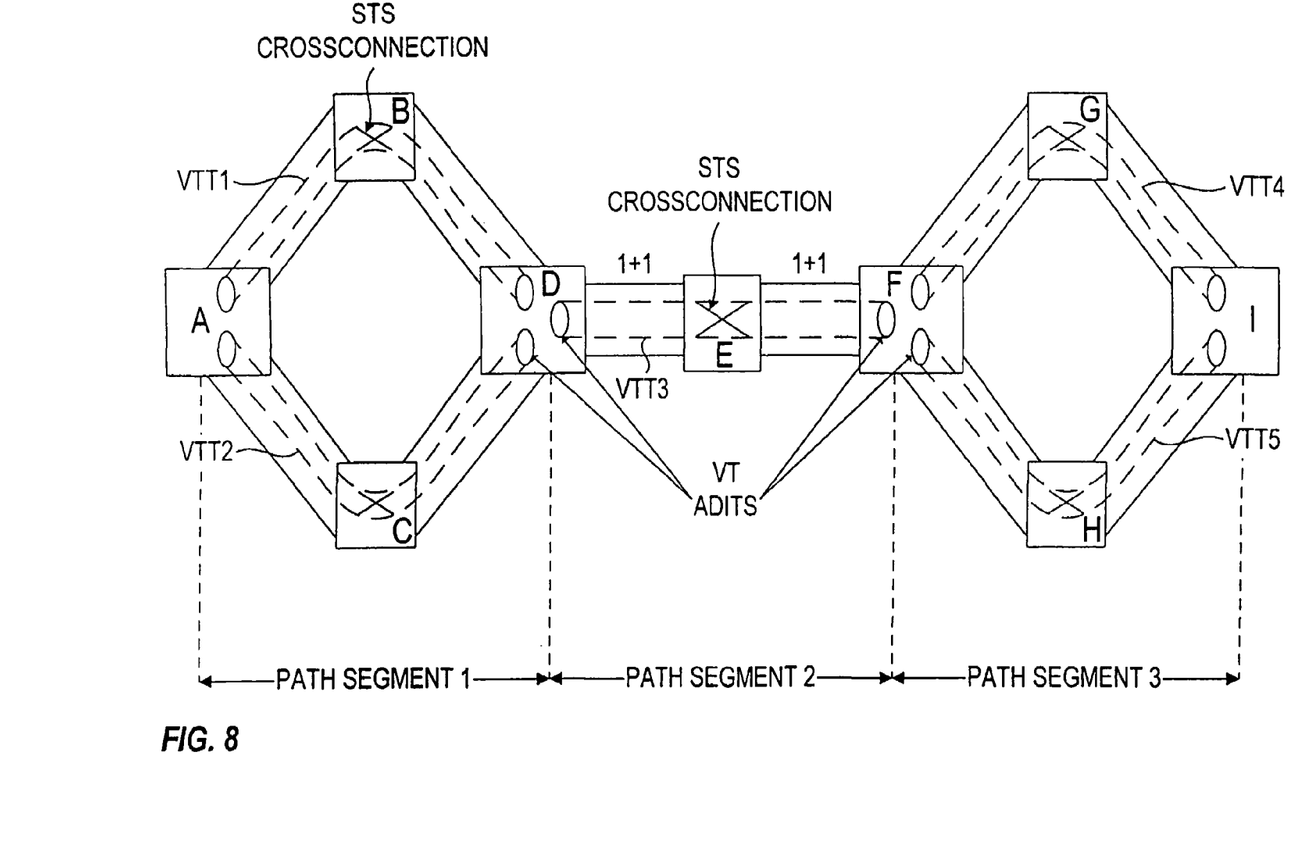
FIG. 8 illustrate how 5 VT Tunnels are created and used to route a protected VT circuit according to one embodiment of the present invention.

When path protection is required for a VT circuit and routing the circuit requires using a VT Tunnel, then the VTT must be a protected VTT. The VTT can be a line protected VTT as described above, or the NMS can provision a virtual UPSR, comprising two VT Tunnels, one primary VTT and one redundant alternate VTT. If a VTT already exists on which to route a VT circuit, then the NMS will create only one additional VTT (i.e., the alternate VTT) to provide UPSR path protection. If a new primary VTT is required to route the circuit, then two VTTs are created to form a path protected VTT. In both cases, a path protected VT circuit can then be routed over the path protected VTT. FIG. 8 illustrate how 5 VT Tunnels are created and used to route a protected VT circuit according to one embodiment of the present invention. VTT1 and VTT2, a primary and alternate, are created between nodes A-D; line protected VTT3 is created between nodes D-F; and VTT4 and VTT5 are created between nodes F-I to form the protected UPSR segment.

The methods and algorithms described herein, as will be evident to those of ordinary skill in the art, can be implemented as software programs which can be stored on computer readable media, and which can be executed on a variety of hardware/software platforms. The methods and algorithms described herein can be coded in a variety of programming languages including but not limited to the object oriented languages JAVA and C++, and such code can be interpreted, compiled, stored and executed on a variety of platforms as will be evident to those of ordinary skill in the art.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for routing Virtual Tributary (VT) circuits in a SONET network without requiring or utilizing VT cross connections on one or more intermediate NE, and wherein the method can be performed by a single Network Element (NE), comprising:

creating a Synchronous Transport Signal (STS) pipe between a first NE and a second NE, said first and second NE providing VT cross connection capability, and said STS pipe traversing at least one intermediate NE; and routing through and within said STS pipe a plurality of VT circuits between said first NE and said second NE, said plurality of VT circuits traversing said at least one intermediate NE on which VT cross connections are not utilized;

wherein routing comprises inserting said VT circuit into said STS pipe at said first NE by a cross connection at said first NE and extracting the VT circuit from said STS pipe at said second NE by a cross connection at said second NE.

2. The method of claim 1 wherein said method is performed manually by a user or is performed automatically by routing and provisioning software.

3. The method of claim 1 wherein the at least one intermediate node does not support or provide VT capability.

4. The method of claim 1 wherein said plurality of VT circuits are VT1.5 circuits or a larger VT circuit and said STS pipe is an STS-1 pipe or larger STS pipe, and wherein if said STS pipe is a STS-1 pipe, said STS-1 pipe being configured to route up to 28 VT1.5 circuits.

5. A computer program embodied on a computer readable medium for routing Virtual Tributary (VT) circuits in a SONET network without requiring or utilizing VT cross connections on one or more intermediate Network Elements (NEs), and wherein each code segment can be stored on and executed by a single Network Element (NE), comprising:
  a code segment for creating a Synchronous Transport Signal (STS) pipe between a first NE and a second NE, said first and second NE providing VT cross connection capability, and said STS pipe traversing at least one intermediate NE; and
  a code segment for routing through and within said STS pipe a plurality of VT circuits between said first NE and said second NE, said plurality of VT circuits traversing said at least one intermediate NE on which VT cross connections are not utilized;
  wherein said code segment for routing comprises a code segment for inserting said VT circuit into said STS pipe at said first NE by a cross connection at said first NE and extracting the VT circuit from said STS pipe at said second NE by a cross connection at said second NE.

6. The computer program of claim 5 wherein said code segment for routing said plurality of VT circuits through and within said STS pipe, routes said VT circuits traversing intermediate nodes, none of which support or provide VT capability.

7. The computer program of claim 5 wherein said STS pipe is an STS-1 pipe.

8. An apparatus for routing Virtual Tributary (VT) circuits in a SONET network without requiring or utilizing VT cross connections on one or more intermediate Network Element (NE), and wherein each of the following means is effected by a single NE, comprising:
  means for creating a Synchronous Transport Signal (STS) pipe between a first NE and a second NE, said first and second NE providing VT cross connection capability, and said STS pipe traversing at least one intermediate NE; and
  means for routing through and within said STS pipe a plurality of VT circuits between said first NE and said second NE, said plurality of VT circuits traversing said at least one intermediate NE on which VT cross connections are not utilized;
  wherein means for routing comprises means for inserting said VT circuit into said STS pipe at said first NE by a cross connection at said first NE and extracting the VT circuit from said STS pipe at said second NE by a cross connection at said second NE.

9. The apparatus of claim 8 wherein none of the intermediate nodes support or provide VT capability.

10. An apparatus for routing Virtual Tributary (VT) circuits in a SONET network without requiring or utilizing VT cross connections on one or more intermediate Network Elements (NEs), and wherein code can be stored on and executed by a single Network Element (NE), comprising:
  a processor; and
  a memory that stores instructions for execution by said processor, said instructions comprising:
  code that creates a Synchronous Transport Signal (STS) pipe between a first NE and a second NE, said first and second NE providing VT cross connection capability, and said STS pipe traversing at least one intermediate NE; and
  code that routes through and within said STS pipe a plurality of VT circuits between said first NE and said second NE, said plurality of VT circuits traversing said at least one intermediate NE on which VT cross connections are not utilized;
  wherein code that routes comprises code that inserts said VT circuit into said STS pipe at said first NE by a cross connection at said first NE and extracts the VT circuit from said STS pipe at said second NE by a cross connection at said second NE.

11. The apparatus of claim 10 wherein said code that routes a VT circuit through and within said STS pipe, routes said VT circuits traversing intermediate nodes, none of which support or provide VT capability.

12. The apparatus of claim 10 wherein said STS pipe is an STS-1 pipe.

* * * * *